US006979834B2

United States Patent
Ochiai et al.

(10) Patent No.: US 6,979,834 B2
(45) Date of Patent: Dec. 27, 2005

(54) IMAGE READING DEVICE, METHOD AND PROGRAM USING INFRARED LIGHT DETECTION TO CORRECT FOR DEFECTIVE PIXELS

(75) Inventors: Toru Ochiai, Tokyo (JP); Shoei Nakamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 98 days.

(21) Appl. No.: 10/798,364

(22) Filed: Mar. 12, 2004

(65) Prior Publication Data

US 2004/0169126 A1 Sep. 2, 2004

Related U.S. Application Data

(63) Continuation of application No. 09/898,015, filed on Jul. 5, 2001, now abandoned, which is a continuation-in-part of application No. 09/525,761, filed on Mar. 14, 2000, now abandoned.

(30) Foreign Application Priority Data

Mar. 15, 1999 (JP) .................................. 11-068597
Jul. 4, 2000 (JP) ............................ 2000-202600

(51) Int. Cl.$^7$ ........................................... G01N 21/86
(52) U.S. Cl. .................. 250/559.42; 382/319; 382/275; 250/559.02; 348/96
(58) Field of Search ............................ 250/208.1, 330, 250/559.4–559.46, 559.02; 382/275, 112, 382/318, 319; 356/402, 405; 348/95–98

(56) References Cited

U.S. PATENT DOCUMENTS

| 4,680,638 A | * | 7/1987 | Childs | .......................... 348/97 |
| 5,266,805 A | | 11/1993 | Edgar | .......................... 250/330 |
| 5,969,372 A | | 10/1999 | Stavely et al. | ......... 250/559.42 |

* cited by examiner

Primary Examiner—Thanh X. Luu
(74) Attorney, Agent, or Firm—Oliff & Berridge PLC (57) ABSTRACT

An image can be read during main scanning under an optimized image reading condition even if dust is attached to a document such as a photographic film or the like, or if there are scratches. A scanner irradiates visible light and infrared light from a light source, and an image of the document is separated into infrared and visible components. These components are detected for pixels of the image by an image sensor. A controller, e.g., of the scanner recognizes defective pixels based on the infrared component. Furthermore, the controller corrects a visible component level in the defective pixel based on the infrared component level of the defective pixel and a reference level obtained where there is no defect, in order to create a histogram. The controller determines image reading conditions such as, for example, an exposure amount (exposure time) for use during main scanning and an LUT gradation conversion characteristic based on this histogram.

38 Claims, 7 Drawing Sheets

IMAGE READING DEVICE, METHOD AND PROGRAM USING INFRARED LIGHT DETECTION TO CORRECT FOR DEFECTIVE PIXELS

INCORPORATION BY REFERENCE

This is a Continuation of U.S. patent application Ser. No. 09/898,015, filed Jul. 5, 2001 now abandoned, which in turn is a Continuation-in-Part of U.S. patent application Ser. No. 09/525,761, filed Mar. 14, 2000 now abandoned. The entire disclosure of both U.S. applications are incorporated herein by reference in their entireties. In addition, the disclosures of the following priority applications are herein incorporated by reference in their entireties: Japanese Patent Application No. 11-068597, filed Mar. 15, 1999 and Japanese Patent Application No. 2000-202600, filed Jul. 4, 2000. Furthermore, the disclosure of U.S. patent application Ser. No. 09/024,124, filed Feb. 17, 1998 is incorporated herein by reference in its entirety.

BACKGROUND OF THE INVENTION

1. Field of the Invention

This invention relates to an image reading device, method and program for reading an image of a transparent document such as a photographic film.

2. Description of Related Art

A photograph is taken under various environments of the natural world. Therefore, there are various kinds of images to be recorded to a transparent document such as a photographic film, ranging from those whose range from the brightest point to the darkest point is wide to those whose range from the brightest point to the darkest point is narrow.

Because of this, when an image that has been actually recorded on a photographic film (e.g., a negative film) is read by a film scanner, prescanning is performed prior to main scanning.

The darkest point and the brightest point of the image can be pre-detected by this prescanning. Additionally, during main scanning, based on the darkest and brightest points of the image that have been detected by this prescanning, image reading conditions are determined, such as exposure amount (exposure time) when image data is read and LUT (Look Up Table) gradation conversion characteristics.

However, when foreign matter such as dust is attached to the film surface, or when there is a scratch, etc., this can be considered as an image during prescanning. This causes problems, particularly in the case of a transparent document such as a negative film. That is, foreign matter such as dust usually shields visible light and deteriorates a visible component level of image data. Because of this, an image of foreign matter may be determined to be the darkest point (the lowest point of the range) of an image (negative image) that has been recorded on the film. Thus, when the darkest point is erroneously recognized, the most appropriate value cannot be obtained for the exposure amount (exposure time), for the LUT gradation conversion characteristic, or the like, when the image is read during main scanning.

The same can be said for the case in which there is a scratch on a photographic film.

SUMMARY OF THE INVENTION

This invention addresses the above-mentioned problems. One object of this invention is to provide an image reading device that can read an image by main scanning using optimal image reading conditions even when foreign matter is attached to a transparent document such as a photographic film and/or there is damage to the document.

In order to accomplish the above and/or other objects, according to one aspect of the invention, an image reading device having an illumination system that irradiates a document with visible light and infrared light and an image detection system that detects an infrared component of an image of the document and a visible light component of the image of the document includes a controller that:

determines an infrared component level for pixels of the infrared component of the image;

detects a defective infrared component level of a defective pixel for which the determined infrared component level is less than a reference level;

determines a visible component level of the pixels of the visible light component of the image;

corrects the visible component level of the defective pixel to obtain a corrected visible component level for the defective pixel based on the reference level and the detected defective infrared component level for the defective pixel;

outputs visible image data based on the detected visible component level of pixels other than the defective pixel and based on the corrected visible component level of the defective pixel; and determines a reading condition of the image of the document based on the visible image data. The visible component level of the defective pixel is corrected, so effects of the defective pixel can be eliminated in determination of the reading condition of the document by using the corrected visible component level.

According to another aspect of the invention, the controller of the image reading device also: (a) determines a minimum brightness level of the visible image data; (b) sets a gradation conversion characteristic with respect to the visible image data based on the detected minimum brightness level; and (c) converts a gradation characteristic of the visible image data based on the set gradation conversion characteristic. Thus, even if the brightness level of the defective pixel is the minimum brightness level, the brightness level is corrected. Therefore, the defective pixel does not affect conversion of gradation characteristics of the visible image date based on the gradation conversion characteristic in addition to setting of the gradation conversion characteristics.

According to another aspect of the invention, the controller of the image reading device calculates the corrected visible component level by multiplying a detected visible component level of the defective pixel by a correction coefficient that is equal to the reference level divided by the defective infrared component level. Therefore, correction of the visible component level in the defective pixel can be performed by a simplified method.

According to another aspect of the invention, the controller of the image reading device determines the minimum brightness level while excluding the detected visible component level of the defective pixel in which the detected infrared component level is less than a predetermined level that is lower than the reference level. Therefore, effects of the defective pixel which are unrecoverable can be eliminated in determination of the reading condition of the document.

According to another aspect of the invention, the controller of the image reading device performs the above-described functions for a plurality of color components of the visible image of the document. Because of this, correction of the defective pixel can be performed for the respective visible wavelength components, and the gradation characteristic of the visible image data can be made to be optimum which eliminates effects of the defective pixel for each respective visible wavelength component.

According to other aspects of the invention, a control program for controlling an image reading device to perform the above-described functions/operations a plurality of procedures can be stored in a recording medium, or represented as a data signal embodied in a carrier wave. The control program can, for example, be recorded in a recording device of an image processing device by downloading or the like via the Internet. Therefore, this image processing device can eliminate effects of the defective pixel in determination of the reading condition of the document

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

The following explains embodiments of this invention with reference to FIGS. 1–12. First, an overall structure of an image processing system 1 to which this invention is applied is explained with reference to FIG. 1.

Figure 1:
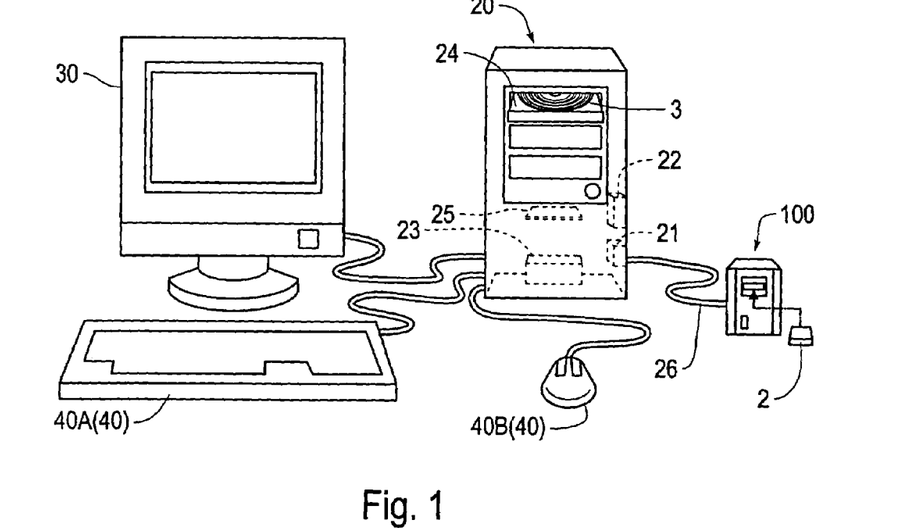
FIG. 1 is an overall structural diagram of an image processing system to which this invention is applied.

The image processing system 1 is constituted by a film scanner (image reading device) 100, a host computer (e.g., a personal computer) 20, a display 30, an input device 40 (e.g., a keyboard 40A, a mouse 40B), and/or the like as shown in FIG. 1. Here, an interface board (e.g., a SCSI board) 25 is housed in the host computer 20. This interface board 25 is connected to the film scanner 100 via an interface cable 26.

The image processing system 1 is operated in accordance with software that is installed in the host computer 20. A user can operate a keyboard 40A and a mouse 40B by looking at the display 30. In response to the operation content, an instruction signal is output to the film scanner 100 from the host computer 20.

The film scanner 100 receives the above-mentioned instruction signal and prescans and main-scans a photographic film (e.g., a transparent document) 2.

Here, prescanning is performed prior to main scanning. As described in detail later, main scanning is performed under image reading conditions (exposure amount, LUT gradation conversion characteristics, and/or the like) that have been determined by prescanning. During prescanning, visible light (three channels of R, G, and B) and infrared light are selectively irradiated onto the photographic film 2 (four channels in total). The irradiation of the three types of visible light is for separating the color components of the image of the transparent document into a plurality of visible components (visible wavelength components). The irradiation of infrared light is to separate the color components of the image of the transparent document into infrared components. Here, performing prescanning by irradiating infrared light is only performed to detect dust (foreign matter) or scratches on the document surface that does not relate to the image of the photographic film 2. This is based on the fact that the dye of the photographic film (negative film is used here) 2 generally transmits infrared light at substantially 100%. That is, with respect to an image obtained by irradiation of infrared light, luminescence lowers due to elements (defects such as a foreign matter) other than color elements. This reduced amount of transmitted infrared light is used to identify a defective pixel(s). Furthermore, the wavelength of the infrared light during prescanning can be determined according to the wavelength characteristics of the dye of the photographic film 2.

Main scanning is performed under the image reading conditions (exposure amount, LUT gradation conversion characteristics, and/or the like) that have been determined by this prescanning. During main scanning, visible light (three channels of R, G, and B) is selectively irradiated onto the photographic film 2. By so doing, the color components of the image of the transparent document can be separated into a plurality of visible components (visible wavelength components).

Figure 2:
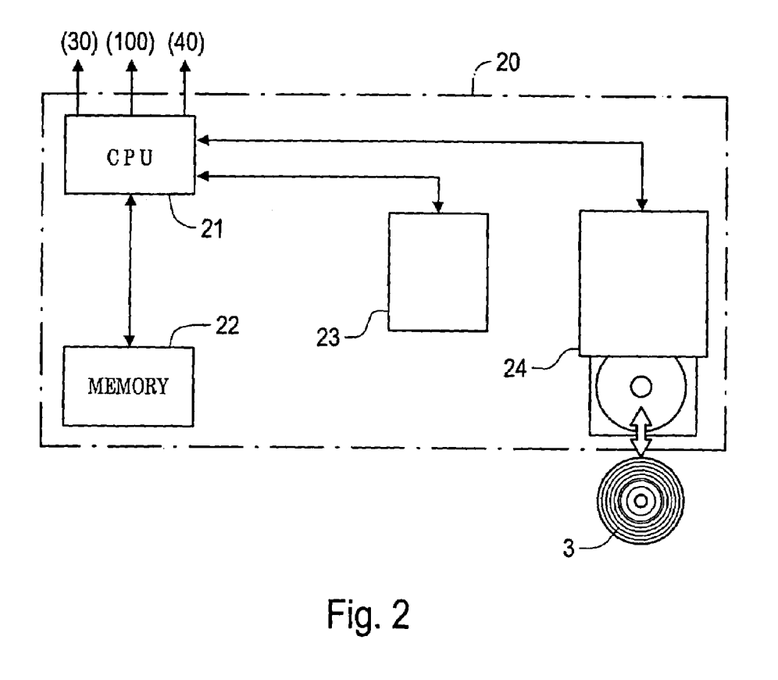
FIG. 2 is a block diagram showing a schematic structure of a host computer.

The image data that has been obtained by main scanning is transferred to the host computer 20. This image data is stored in a hard disk 23 or the like within the host computer 20. As shown in FIG. 2, the host computer 20 includes a CPU 21, a memory 22, a hard disk 23, and a CD-ROM drive 24.

The CPU 21 executes control programs stored in the hard disk 23, a CD-ROM (storage medium) 3, or the like in accordance with an instruction that has been input from the input device 40. The CPU 21 performs processing of the image data that has been obtained, provides instructions for image reading to the film scanner 100, and the like in accordance with this program.

Figure 3:
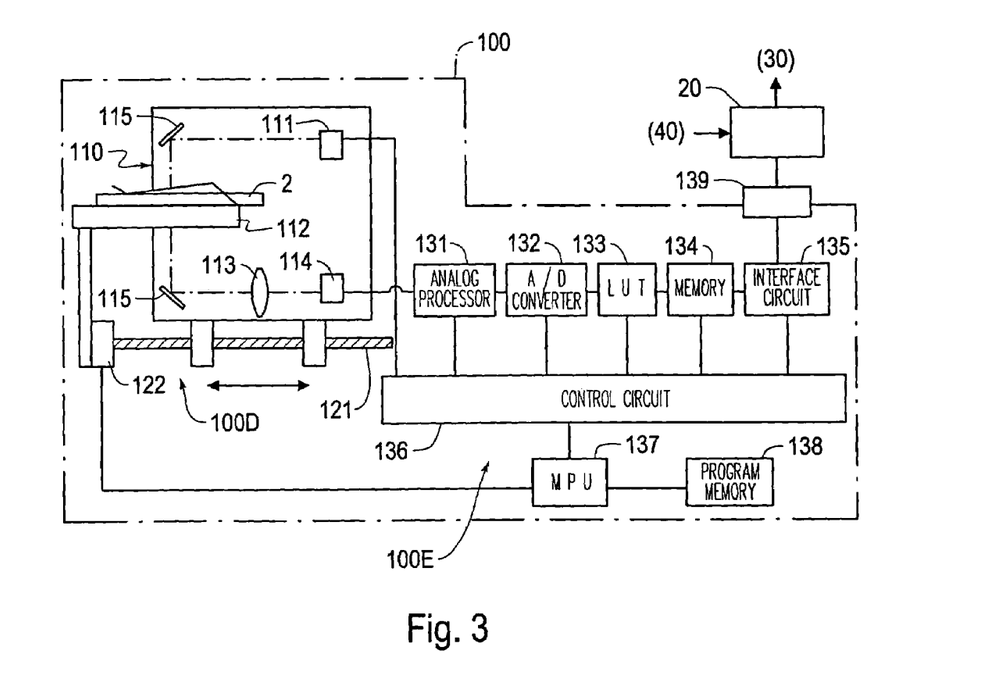
FIG. 3 is a block diagram showing a structure of a film scanner.

As shown in FIG. 3, the film scanner 100 is constituted by a scanner block 110, a lens driving part 100D, and a controller 100E. In the scanner block 110, a light source 111, a holder (film holder) 112, a lens 113 that forms an image optical system, an image sensor (e.g., a CCD) 114, and mirrors 115, 115 which together form a shooting optical system are arranged.

The light source 111 can be formed of a plurality of light emitting diodes that emit three types of visible light (e.g., R, G and B) with different visible wavelength components, and infrared light. The three types of visible light and infrared light from the light source 111 are selectively irradiated at a predetermined timing onto the photographic film 2. This irradiation is performed in response to a control signal output from a control circuit 136 described hereafter. By so doing, the light source 111 functions as a visible component separation means and an infrared component separation means.

In the holder 112, a transparent document is held. Here, the transparent document is a photographic film (negative film) 2 (see FIG. 4).

Figure 4:
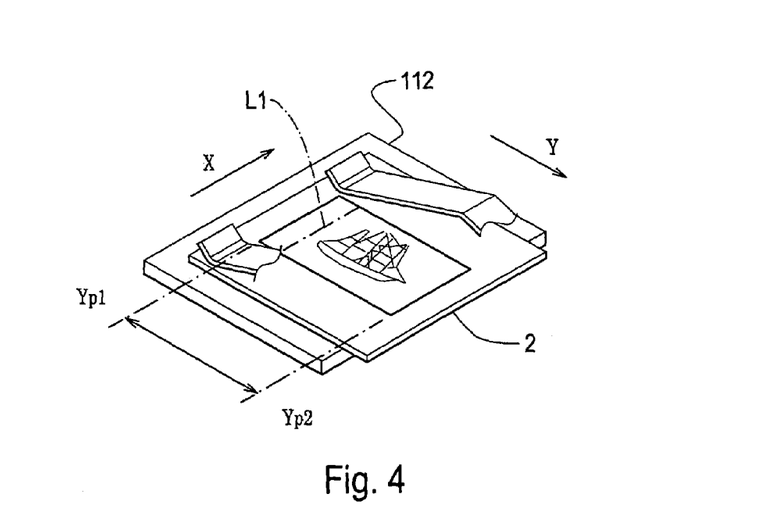
FIG. 4 is an explanatory diagram showing a main scanning direction and a subscanning direction during scanning of a photographic film.

The image sensor 114 reads one line of an image in a main scanning direction X of the photographic film 2 held in the holder 112 (reading of the image along a line L1 in FIG. 4). In other words, when any of the three types of visible light or the infrared light is selectively irradiated, the image sensor 114 transfers a charge signal showing luminescence to the controller 100E (specifically, to the analog processing circuit 131) pixel-by-pixel for every line. A charge signal from the image sensor 114 is transferred to the controller 100E and is used in order to recognize an image that was separated into the respective visible components (visible wavelength components) and an infrared component.

The lens driving part 100D is constituted by a lead screw 121 to drive the scanning block 110 and a scanning motor 122. The scanning motor 122 is, e.g., a stepping motor. Additionally, an axis of the scanning motor 122 is coupled to and drives the lead screw. The lead screw 121 that is connected to the scanning motor 122 is engaged to a through hole (undepicted) of the scanning block 110.

The scanning motor 122 is rotated at a predetermined angle in response to the number of pulses of a driving signal output from the controller 100E. At this time, the scanning block 110 is step-moved (moved in the subscanning direction shown by arrow Y in FIGS. 4 and 5) at a predetermined interval (e.g., Pp1 of FIG. 5) relative to the photographic film 2 in response to the number of pulses.

The controller 100E is constituted by an analog processing circuit 131, an A/D converter 132, a LUT circuit 133, a memory 134, an interface circuit 135, a control circuit 136, a microprocessor unit (MPU) 137, and a program memory 138. Furthermore, in this embodiment, the controller 100E functions as an infrared component detecting means, a defective infrared component detecting means, a visible component detecting means, a correcting means, a visible image data obtaining means, a reading condition determining means, a minimum brightness level detecting means, a gradation conversion characteristic setting means, and a gradation characteristic conversion means.

The analog processing circuit 131 is constituted by a sample and hold circuit, a clamp circuit, an offset circuit, and/or the like. This analog processing circuit 131 performs signal processing to the charge signal transferred from the image sensor 114 (pixel-by-pixel). That is, the sample and hold circuit performs signal processing such as removal of unnecessary signal components. The clamp circuit improves stabilization by clamping part of the signal. The offset circuit adjusts the signal level to a predetermined level.

The A/D converter 132 converts the analog signal from the analog processing circuit 131 to a digital signal (image data). The LUT circuit 133 performs gradation conversion processing, in accordance with a LUT gradation table (FIG. 11), to the digital signal output from the A/D converter 132. The memory 134 temporarily stores image data for one line detected by the main scanning direction of the image sensor 114.

The control circuit 136 outputs a control signal to control lighting of the light source 111. Additionally, the control circuit 136 outputs a control signal, such as a clock signal/reading gate signal, for the image sensor 114. Furthermore, the control circuit 136 outputs a control signal instructing a conversion start timing to the A/D converter 132. In addition, the control circuit 136 outputs a control signal such as a memory address signal/memory writing signal. Here, the memory address signal/memory writing signal are signals to gradation-convert the signal in the LUT circuit 133 and successively write to the memory 134.

MPU 137 determines the type of light (any of R, G, B, and infrared light) irradiated from the light source 111. Furthermore, the MPU 137 determines the lighting time (exposure time) of the light source 111. The charge amount (corresponding to the light amount) that is accumulated during the accumulation time (accumulation of the signal charge) of the image sensor 114 is adjusted by the control of the lighting time of the light source 111.

Additionally, the MPU 137 determines the timing of accumulation/transfer of the charge by the image sensor 114 in relation to the lighting time of the light source 111. Various instruction signals that indicate instructions that have been thus determined are converted to the above-mentioned specific control signals by the control circuit 136. These control signals are output to the light source 111, the image sensor 114, and the like by the control circuit 136.

Meanwhile, the MPU 137 recognizes a total of four channels of image data (visible image data, infrared image data) of the respective color components of visible light (R, G, and B) and infrared light, based on the charge signal from the image sensor 114. Furthermore, after the MPU 137 recognizes that one line of image data has been performed by the image sensor 114 with respect to four types of light (R, G, B, and infrared light), a predetermined number of driving signals (pulse signals) is output to the scanning motor 122, which then moves the scanning block 110 one step at a predetermined interval Pp1.

Additionally, the MPU 137 determines the exposure amount (exposure time) during main scanning, the LUT gradation conversion characteristics, and the like based on image data (visible image data, infrared data) generated by the operation of the image sensor 114, the analog processing circuit 131, and the like during prescanning. In addition, a main scanning program (undepicted) and a prescanning program (FIG. 6) executed by MPU 137 are stored in the program memory 138.

Figure 6:
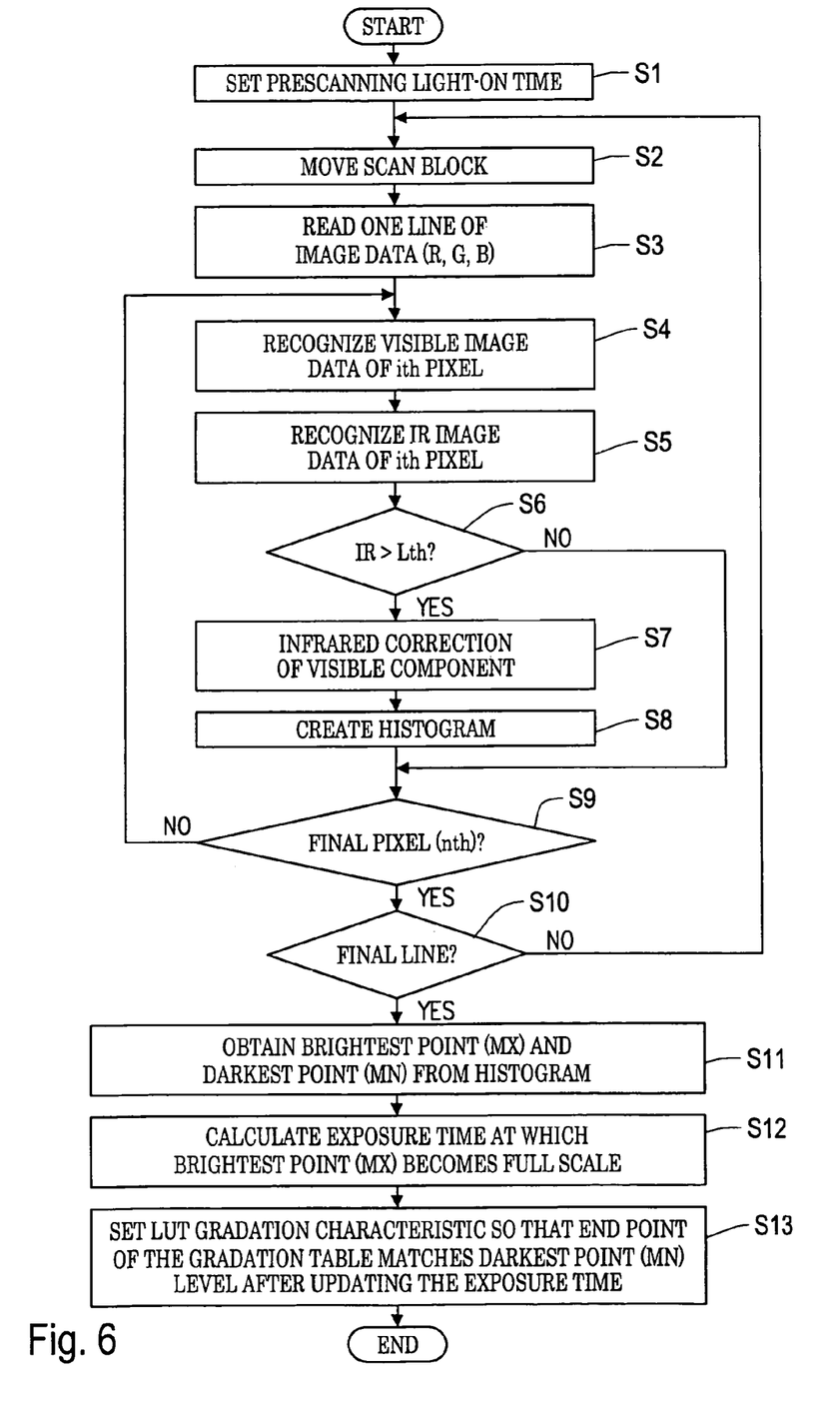
FIG. 6 is a flowchart showing a prescanning program according to an embodiment of the invention.

Next, prescanning that determines the exposure amount (exposure time) during main scanning and the LUT gradation conversion characteristics is explained in accordance with the prescanning program of FIG. 6. Prescanning is performed to broaden a dynamic range of an output image (final output image) from the film scanner 100. The exposure amount (exposure time) during main scanning and the LUT gradation conversion characteristics can be optimized by this prescanning. As a result, the quality of the image that has been read during main scanning is improved.

When this prescanning program (FIG. 6) begins, first, in step S1, the lighting time (light-ON time) during prescanning is set to a predetermined value. In the following step S2, the scanning motor 122 is rotated by a predetermined angle, and the scanning block 110 is moved (it is moved to a prescanning start position (Yp1 of FIG. 5) immediately after the program starts).

In step S3, four channels of light (i.e., three channels of visible light (R, G, and B) and one channel of infrared light) are sequentially irradiated from the light source 111. Based on the charge signal obtained from this image sensor 114, image data for one line is obtained.

In step S4, three types (R, G, and B) of image data are recognized in one pixel (ith image data) among image data for one line that was obtained. In the following step S5, image data for the infrared component is recognized.

In the following step S6, it is determined whether the infrared component level of the recognized infrared image data is larger than a predetermined threshold Lth. If this determination result is "Yes", in step S7, with respect to the pixels in which the infrared component level is larger than the threshold Lth, "infrared correction" using the infrared component level is performed (a correction visible component level is obtained).

Figure 7:
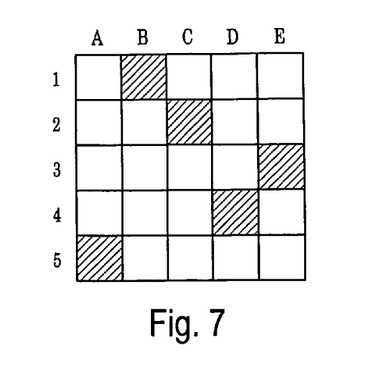
FIG. 7 is an explanatory view showing defective pixels with hatching.

In the following step S8, based on the image data after this "infrared correction," a histogram (visible image data) is created. As shown in FIG. 7, a case in which defective pixels (shown by hatching in the figure) exist on the photographic film (transparent document) 2 is considered.

Figure 8:
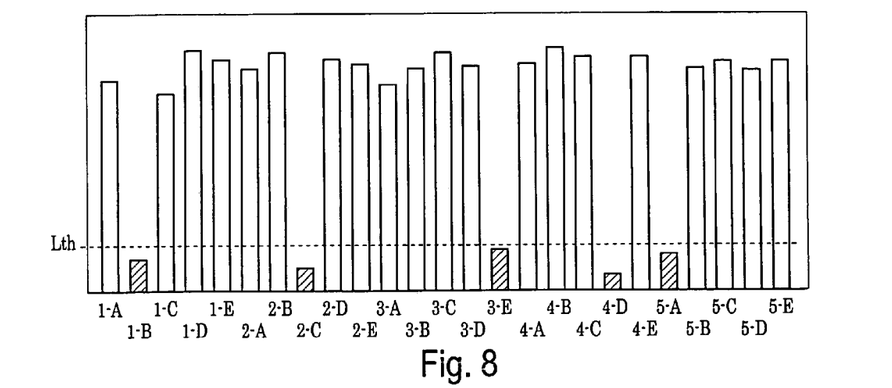
FIG. 8 is a graph showing an infrared component level of each pixel of an image having defect pixels.

If image reading using infrared light is performed with respect to this transparent document, FIG. 8 shows a state of infrared component data of (1-A), (1-B), . . . (5-D), and (5-E). Here, with respect to the data of (1-B), (2-C), (3-E), (4-D) and (5-A), the infrared component level is less than a predetermined threshold Lth (predetermined level lower than the reference level IL), so it cannot be saved by "infrared correction". Because of this, the data of pixels (1-B), (2-C), (3-E), (4-D) and (5-A) will be ignored with respect to creation of a histogram.

Figure 9:
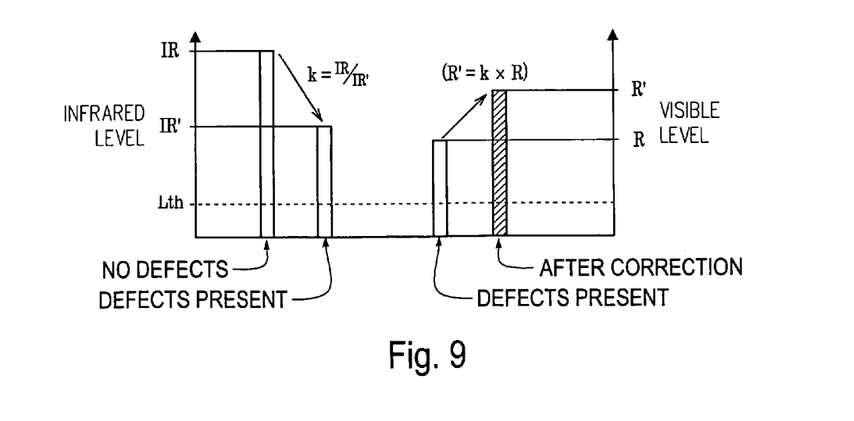
FIG. 9 is a diagram explaining a principle of infrared correction according to an embodiment of the invention.

Meanwhile, "infrared correction" is performed in accordance with the following procedure with respect to other pixels. FIG. 9 is a diagram explaining a principle of "infrared correction". Furthermore, here, in order to simplify the explanation, "infrared correction" of the red components is explained; however, with respect to the G and B components, "infrared correction" is performed in the same procedure.

When dust, scratches, or the like can be seen on the photographic film 2, the illumination light is shielded by the dust, scratches, or the like, so the light amount that transmits through the photographic film 2 and reaches the image sensor 114 decreases. That is, the data with dust, scratches, or the like becomes data that is darker than the image that is actually recorded on the photographic film 2. Here, the photographic film 2 transmits a predetermined wavelength of infrared light according to the wave characteristics of the color elements at substantially 100%. Therefore, the irradiated predetermined wavelength of infrared light is not affected by the image that is recorded on the photographic film 2. That is, when a predetermined wavelength of infrared light is irradiated, the data that was obtained by the image sensor 114 shows only a light amount that is decreased by dust, scratches, or the like.

When there is no defect on the photographic film 2, a transmittance level of the infrared light shows a constant value (maximum value IR) as shown in the left side of FIG. 9. When there is a defect, the transmittance level of the infrared light shows a smaller value (e.g., the decreased value IR') for the level which is decreased by a defect (dust, scratches, or the like) from the constant value (maximum value IR).

Therefore, prior to reading the image data of the photographic film 2, the maximum value IR is obtained by using other photographic film without any defect. Alternatively, if this maximum value (IR) is already known, the value is stored in the memory in advance.

Additionally, with respect to the photographic film 2, the transmittance level (decreased value IR') of the infrared light is obtained. Furthermore, a correction coefficient k (=IR/IR') showing the decrease of the infrared light due to dust, scratches, or the like in the photographic film 2 is obtained by these two values (maximum value IR, decreased value IR').

Next, a transmittance level (R) is obtained by irradiating visible light (in this example, red light is used) onto the photographic film 2. The transmittance level (R) that was obtained at this time includes both the image data of the recorded image and a decreased light amount due to scratches or the like.

Then, by multiplying the above-mentioned correction coefficient k by the transmittance level (R), with respect to the transmittance level (R) including the decreased amount, the transmittance level (R') that excludes any effect (decrease) due to dust, scratches, or the like can be obtained.

However, effectiveness of this infrared correction is limited to the case when the data stored in the photographic film 2 includes data (R) of the color component (red is used here) of the visible light that received a limited amount of decrease due to defects. That is, when the level of IR' which determines the ratio (IR/IR') is lower than a predetermined value (Lth), a decreased amount (of the detected visible light) due to dust, scratches, or the like is too large. Therefore, reliability of data due to illumination light of the visible light is low. In such a situation, even if infrared correction is performed, accurate image data of the image recorded in the photographic film 2 cannot be obtained. As will be described later, the image data of such excessively defective pixels is not corrected and is not used to prepare the histogram.

Image data in which defect correction (infrared correction) was performed in steps S6 and S7 is used in order to create a histogram (FIG. 10A) (step S8). In the following step S9, it is determined whether the pixel in which "infrared correction" was performed was the last pixel (nth) of the image data of the one line. If this determination result is "No", the program returns to step S4, and "infrared correction" is repeated for the next pixel in the line.

Meanwhile, if the determination result in step S9 is "Yes", the program moves to step S10 and determines whether the pixel in which "infrared correction" was performed in this loop was the last line. When this determination result is "No", processing proceeds to step S2, and then the next line is scanned and processed as described above.

Figure 10A:
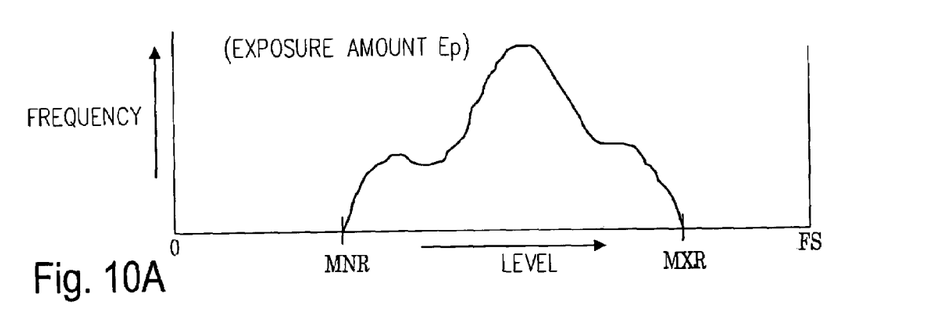
FIGS. 10A and 10B are graphs showing histograms that can be obtained during prescanning.

When the determination result of step S10 becomes "Yes", the program moves to step S11, and the brightest point (MXR) and the darkest point (MNR) are calculated from the created histogram (FIG. 10A). The brightest point (MXR) and the darkest point (MNR), which were thus obtained, are used in order to determine the most appropriate value of the exposure amount (exposure time) and the LUT gradation conversion characteristics.

In the following step S12, the exposure time during main scanning is calculated so that the above-mentioned brightest point (MXR) becomes a full scale (a maximum value that does not result in over-saturation of the image sensor). The calculated exposure time is set as an exposure time during main scanning.

Here, by focusing on the brightest point (MXR), the exposure amount (E1) is determined based on the following equation (1) so that this becomes a full scale (FS).

$$E1 = Ep \times FS / MXR \quad (1)$$

Figure 10B:
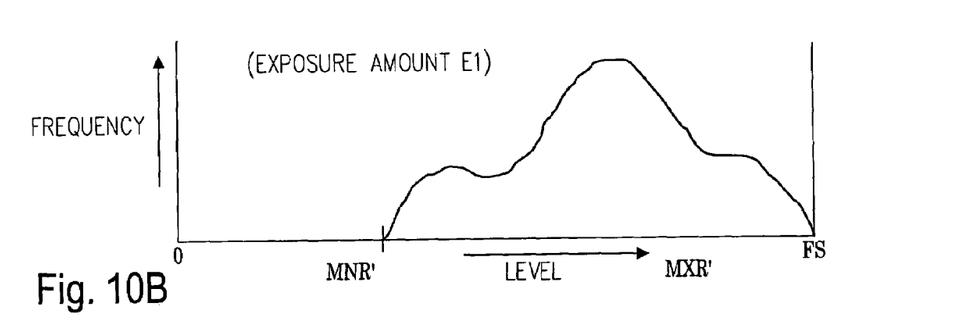

Here, Ep is the exposure amount obtained during prescanning. Based on this E1, the exposure time (the visible light exposure time of the light source 111) is determined. As a result, even when there is a transmitted light amount distribution during prescanning as shown in FIG. 10A, the transmitted light amount distribution is obtained during main scanning as shown in FIG. 10B. That is, the brightest point MXR of the transparent document is matched with the full scale value FS.

Figure 11:
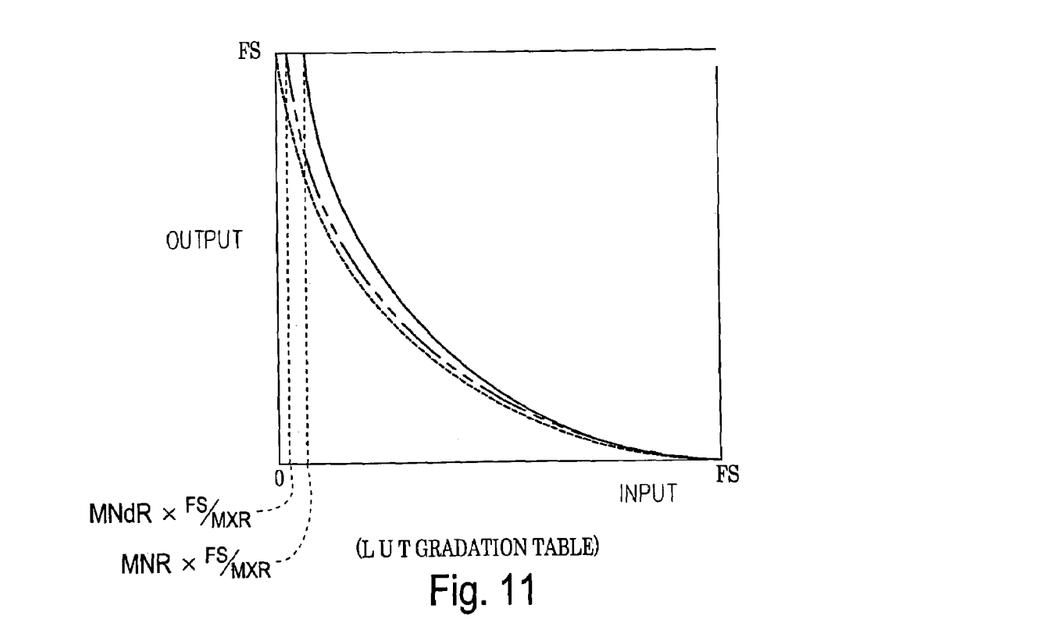
FIG. 11 is a graph showing a LUT gradation table.

In step S13, the LUT gradation conversion characteristics are determined so that the darkest point (MNR) by the above-determined exposure time matches the end point of the gradation table (FIG. 11). In this step, MPU 137 functions as a gradation conversion characteristic means. The LUT gradation conversion characteristics are set so that the darkest point (MNR) level of the input side during irradiation by E1 becomes the highest output (the end point of the LUT gradation conversion characteristics) after being converted.

Here, the darkest point (MNR) level also changes and becomes the darkest point (MNR') level. This is because the exposure amount (exposure time) changes at the same ratio when the exposure amount is changed as described above. The darkest point (MNR') after being changed is obtained by the following equation (2).

$$MNR' = MNR \times FS/MXR \qquad (2)$$

Based on this darkest point (MNR'), the LUT gradation conversion characteristics are determined (solid line of FIG. 11). Here, the ratio of the entire LUT gradation conversion characteristics (broken lines in FIG. 11) in which "0" is a reference point is corrected with the full scale side (right side) as the origin (dotted lines→solid line in FIG. 11). FIG. 11 shows a LUT gradation table when a negative film is used. The LUT gradation conversion characteristics vary depending on the type of film (e.g., manufacturer, ISO value, or the like), the transmitted light amount distribution, and the like.

Furthermore, when the LUT gradation conversion characteristics are determined based on the darkest point (=MNdR0) using the defective pixels, a curved line can be seen which is shown by the two-dotted line of FIG. 11. Because the actual darkest point of the image is MNR', a full scale output cannot be obtained by this curved line. If the defective pixels are not removed, the dynamic range becomes too narrow by this amount.

Thus, by creating the histogram (FIG. 10A) by the image data in which defect correction was performed by infrared correction and using the darkest point MNR and the brightest point MXR of the histogram, the exposure amount (exposure time) during main scanning and the LUT gradation conversion characteristics can be optimized.

The following briefly explains main scanning that is executed by using the exposure amount and the LUT gradation conversion characteristics determined by the prescanning. Main scanning is executed after prescanning when a user inputs a signal that starts main scanning from the input device 40 to the host computer 20. In the film scanner 100 that has received the instruction signal, the MPU 137 executes the above-mentioned prescanning, and then the main scanning begins.

According to the main scanning program (not depicted), the MPU 137 first outputs a control signal (driving signal) to the scanning motor 122. By so doing, the scanning block 110 is moved to a reading start position (main scanning start position). This main scanning start position is the same as the above-mentioned prescanning start position (the reading line L1 is Yp1 of FIG. 5).

Figure 5:
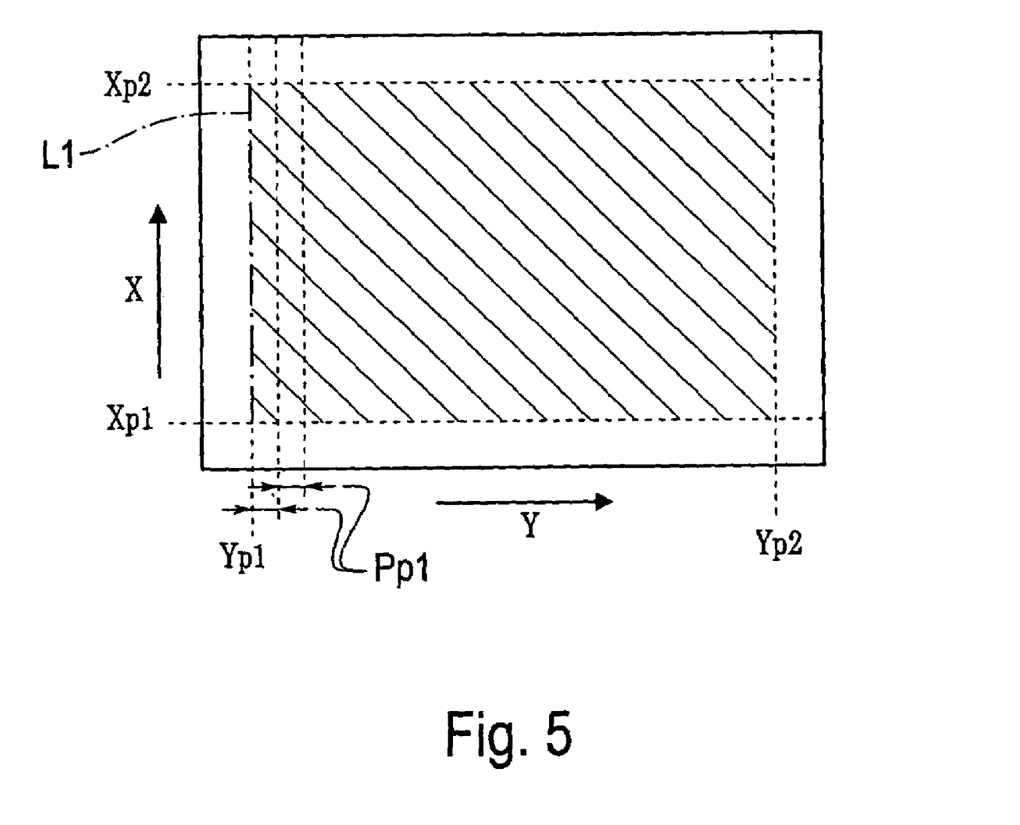
FIG. 5 is a diagram showing a reading region of a photographic film.

Furthermore, the main scanning and subscanning of the image sensor 114 are from points Xp1 to Xp2 and from points Yp1 to Yp2 of FIG. 5, respectively, in the same manner as in prescanning. Additionally, the reading pitch is set at a desired pitch each time according to the reading condition of main scanning.

When the scanning block 110 is moved to the main scanning start position, specified light (R, G, and B) is sequentially irradiated from the light source 111, with respect to the one line (L1), and the image for one line is read by the image sensor 114 (main scanning). The read image is processed by the analog processing circuit 131 as a plurality of charge signals for the respective pixels. Then, the plurality of charge signals are sequentially A/D converted by the A/D converter 132 and become digital signals (pixel data).

Based on an instruction from the MPU 137, the LUT circuit 133 sequentially LUT-gradation converts the pixel data (i.e., MPU 137 functions as a gradation characteristic converting means). The LUT gradation conversion is performed in accordance with the LUT converting table (FIG. 11). The converted image data for one line is temporarily stored in the memory 134. The image data for one line stored in the memory 134 is later transferred to the host computer 20 (the memory 22 and/or the hard disk 23, etc.).

When the charge signal that shows the image for one line is output from the image sensor 114, the scanning motor 122 is rotated. Along with this rotation, the image scanner 114 is again step-moved in the subscanning direction at a specified pitch. At this time, the visible light (R, G, B) is irradiated from the light source 111, and the image of the following line is read. This processing is performed with respect to the subscanning direction (Yp1–Yp2).

As described above, the LUT gradation conversion characteristics by the LUT circuit 133 and the irradiation time (exposure time) of the light source 111 are determined based on the brightest point (MXR or MXR') and the darkest point (MNR or MNR') of the corrected histogram (FIG. 10B) in which defective pixels caused by dust (foreign matter) and/or scratches are corrected when main scanning is performed. As a result, the LUT gradation conversion characteristics and the exposure amount (exposure time) during main scanning can be optimized without having any effect of defective pixels caused by dust (foreign matter) and/or scratches.

Figure 12:
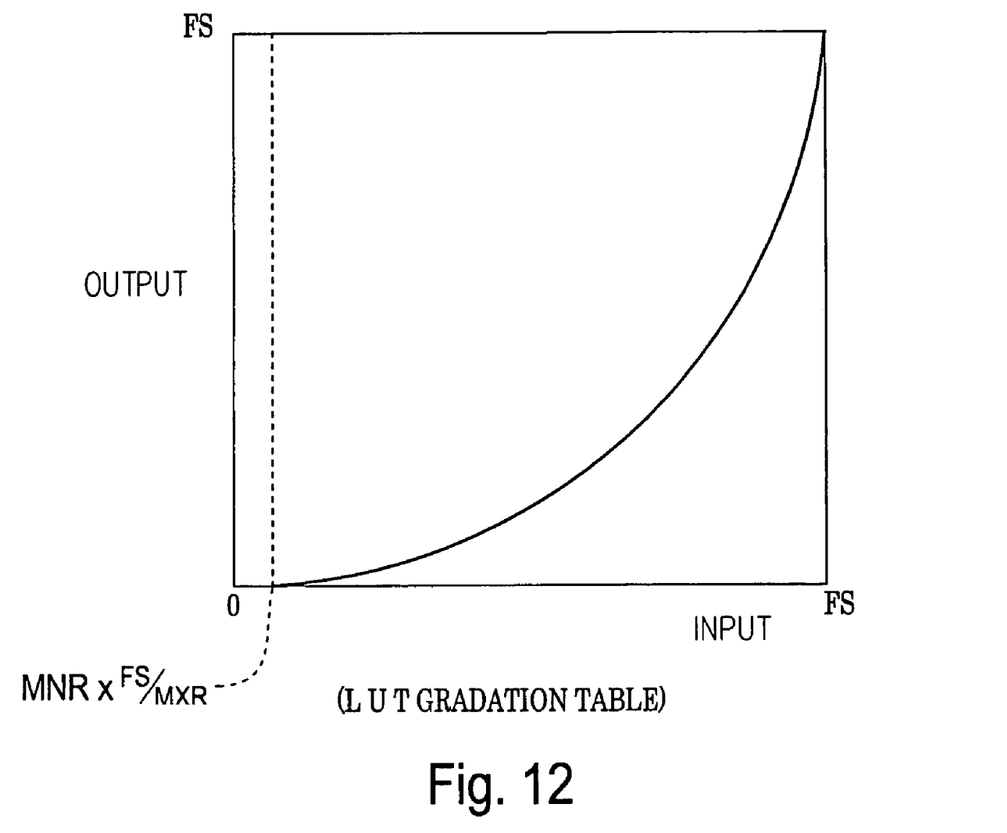
FIG. 12 is a graph showing a LUT gradation table used when a positive-type film is read.

Furthermore, in the above-mentioned embodiment, an example was explained using a negative film as a transparent document, but the invention is not limited to negative films. This invention can also be applied to the case where a positive film is used as a transparent document. At this time, instead of the LUT converting table (negative film) shown in FIG. 11, the LUT conversion can be executed by using a LUT converting table (for a positive film) as shown in FIG. 12. In this case, in the LUT converting table for the positive film as well, based on the darkest point MNR'(=MNR×FS/MXR), which was obtained by the above-mentioned procedure, the LUT gradation conversion characteristics during main scanning can be determined (solid line of FIG. 12).

Additionally, in the above-mentioned embodiment, the MPU 137 of the film scanner controls an image for prescanning; however, the CPU 21 of the host computer 20 can also control the image for prescanning. In this case, the prescanning program can be stored in the hard disk 23, for example.

In addition, by recording the prescanning program to a CD-ROM (recording medium) 3, these programs can be executed by the CPU 21 or MPU 137 of existing machines as long as they can irradiate with (or be modified to irradiate with) IR light.

Furthermore, in the above-mentioned embodiment, the LUT gradation conversion characteristics are determined for the respective histograms by creating three histograms, corresponding to the three types of visible wavelength components. However, the LUT gradation conversion characteristics can also be determined by focusing on one visible wavelength component only. The LUT gradation conversion characteristics that were obtained at this time can also be used for other visible wavelength components.

Additionally, in the above-mentioned embodiment, three types of visible light R, G, and B are used as visible wavelength components, but needless to say, other visible wavelength components can also be used. Furthermore, needless to say, the gradation conversion characteristics are not limited to the examples shown in the above-mentioned embodiment.

Additionally, in the above-mentioned embodiment, the example was explained showing the LUT conversion for an image signal that has been digitally converted by the A/D converter, but LUT conversion can also be performed by the analog circuit to the analog signal prior to A/D conversion.

Furthermore, in the above-mentioned embodiment, an example was explained in which a light source 111 is used that can irradiate three types of visible light R, G, and B and infrared light, but the image data of the respective color components R, G, and B and the infrared light can also be obtained by arranging a filter(s) in the image sensor.

Furthermore, in the above-mentioned embodiment, an example was explained in which, every time one image is read, by using the infrared histogram and the image histograms that had been obtained during prescanning, the exposure amount/LUT conversion characteristics during main scanning were determined. However, prescanning may be performed only once, the visible histogram and the infrared histogram may be obtained, and then the exposure amount/LUT conversion characteristics during main scanning that uses these histograms can be determined for a plurality of images that are read.

Furthermore, the image reading program may be accessed from a predetermined home page via the Internet and can be downloaded to the host computer 20 as driver software or firmware.

For example, in a state in which the image reading program can be accessed from a predetermined home page by the host computer 20, this type of downloading can be performed by selecting a film scanner which is one of the image reading devices from the product display on the screen and selecting driver software or firmware that matches the office service environment of the host computer 20.

Additionally, the following dial up connection can be applied as a state connecting the host computer 20 to the Internet. That is, the host computer 20 is connected to telephone lines via a modem or a terminal adapter and is connected to a modem or a terminal adapter of a provider, which is an Internet connection service company, by the telephone lines. The modem or terminal adapter of the provider is connected to a server, and the server is connected to the Internet via a rooter which sets a relay route. Thus, the host computer 20 can be connected to the Internet (home page) via a server of the provider through telephone lines.

According to one aspect of the invention, even if foreign matter is attached to a transparent document or if the document is scratched, when the reading condition of the transparent document is determined, quality can be optimized without receiving any adverse effect due to foreign matter or the like, and image quality of the read image can be improved.

Furthermore, according to another aspect of the invention, even if foreign matter is attached to a transparent document or when there is a scratch, the gradation conversion characteristic based on the visible image data is determined after the effects due to foreign matter or the like are removed by correction. Because of this, the gradation conversion characteristic can be optimized for an image, and image quality can be improved.

In addition, according to another aspect of the invention, even if foreign matter is attached to a transparent document or when there is a scratch, compensation for the effects given to the visible component by foreign matter or the like can be easily effected. A reading condition can be optimized for an image, and image quality of the read image can be improved.

Additionally, according to another aspect of the invention, if there is a situation in which a visible component is unrecoverable due to foreign matter attached to a transparent document or due to a scratch, by ignoring the defective pixel in the determination of the reading condition, effects due to foreign matter can be removed as much as possible, and image quality can be improve.

Furthermore, according to another aspect of the invention, with respect to all the visible image data with different color components, by correcting effects due to foreign matter, scratches, etc. in the defective pixel(s), a fine gradation conversion characteristic can be set for each respective color component. As a result, without having any effects of the defective pixel, an appropriate color image can be obtained.

Additionally, according to another aspect of the invention, a program that optimally avoids the affects of foreign matter or the like even if attached foreign matter or scratches exist when the reading condition of the transparent document is determined improves image quality of the read image, and can be written in a recording device within the image processing device, for example, via the Internet.

In the illustrated embodiment, the controller 100E is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An image reading device comprising:
   infrared component forming means for forming an infrared component of an image of a document;

infrared component detecting means for detecting an infrared component level of the infrared component for pixels of the image;

defective infrared component detecting means for detecting a defective infrared component level of a defective pixel for which the detected infrared component level is less than a reference level;

visible component forming means for forming a visible component of the image of the document;

visible component detecting means for detecting a visible component level for the pixels of the image;

correcting means for correcting the visible component level of the defective pixel to obtain a corrected visible component level for the defective pixel based on the reference level and the detected defective infrared component level for the defective pixel;

visible image data obtaining means for outputting visible image data based on the detected visible component level of pixels other than the defective pixel and based on the corrected visible component level of the defective pixel; and reading condition determining means for determining a reading condition of the image of the document based on the visible image data.

2. The image reading device of claim 1, further comprising:

minimum brightness level detecting means for detecting a minimum brightness level of the visible image data;

gradation conversion characteristic setting means for setting a gradation conversion characteristic with respect to the visible image data based on the detected minimum brightness level; and gradation characteristic conversion means for converting a gradation characteristic of the visible image data based on the set gradation conversion characteristic.

3. The image reading device of claim 2, wherein the correcting means calculates the corrected visible component level by multiplying a detected visible component level of the defective pixel by a correction coefficient that is equal to the reference level divided by the defective infrared component level.

4. The image reading device of claim 3, wherein the minimum brightness level detecting means detects the minimum brightness level while excluding the detected visible component level of the defective pixel in which the detected infrared component level is less than a predetermined level that is lower than the reference level.

5. The image reading device of claim 2, wherein the minimum brightness level detecting means detects the minimum brightness level while excluding the detected visible component level of the defective pixel in which the detected infrared component level is less than a predetermined level that is lower than the reference level.

6. The image reading device of claim 2, wherein:

the visible component forming means forms a plurality of visible wavelength components of the image;

the visible image data obtaining means outputs visible image data for each of the plurality of visible wavelength components;

the defective infrared component detecting means detects the defective pixel from the visible image data for each of the plurality of visible wavelength components;

the minimum brightness level detecting means detects the minimum brightness level of the visible image data for each of the plurality of visible wavelength components;

the gradation conversion characteristic setting means sets the gradation conversion characteristic for the visible image data for each of the plurality of visible wavelength components based on the minimum brightness level for each of the visible wavelength components; and the gradation characteristic converting means converts the gradation characteristic of the visible image data for each of the plurality of visible wavelength components based on the set gradation conversion characteristic for each of the visible wavelength components.

7. An image reading device comprising:

an illumination system that irradiates a document with visible light and infrared light;

an image detection system that detects an infrared component of an image of the document and a visible light component of the image of the document; and a controller that:

determines an infrared component level for pixels of the infrared component of the image;

detects a defective infrared component level of a defective pixel for which the determined infrared component level is less than a reference level;

determines a visible component level of the pixels of the visible light component of the image;

corrects the visible component level of the defective pixel to obtain a corrected visible component level for the defective pixel based on the reference level and the detected defective infrared component level for the defective pixel;

outputs visible image data based on the detected visible component level of pixels other than the defective pixel and based on the corrected visible component level of the defective pixel; and determines a reading condition of the image of the document based on the visible image data.

8. The image reading device of claim 7, wherein the controller:

determines a minimum brightness level of the visible image data;

sets a gradation conversion characteristic with respect to the visible image data based on the detected minimum brightness level; and converts a gradation characteristic of the visible image data based on the set gradation conversion characteristic.

9. The image reading device of claim 8, wherein the controller calculates the corrected visible component level by multiplying a detected visible component level of the defective pixel by a correction coefficient that is equal to the reference level divided by the defective infrared component level.

10. The image reading device of claim 9, wherein the controller determines the minimum brightness level while excluding the detected visible component level of the defective pixel in which the detected infrared component level is less than a predetermined level that is lower than the reference level.

11. The image reading device of claim 8, wherein the controller determines the minimum brightness level while excluding the detected visible component level of the defective pixel in which the detected infrared component level is less than a predetermined level that is lower than the reference level.

12. A computer readable storage medium that stores a control program to control an image reading device having an illumination system that irradiates a document with visible light and infrared light, and an image detection system that detects an infrared component of an image of the document and a visible light component of the image of the document, the control program comprising:

an infrared component procedure that determines an infrared component level for pixels of the infrared component of the image;

a defective infrared component detecting procedure that detects a defective infrared component level of a defective pixel for which the determined infrared component level is less than a reference level;

a visible component procedure that determines a visible component level of the pixels of the visible light component of the image;

a correcting procedure that corrects the visible component level of the defective pixel based on the reference level and the defective infrared component level to obtain a corrected visible component level;

a visible image data obtaining procedure that outputs visible image data according to the visible component level of pixels other than the defective pixel and the corrected visible component level of the defective pixel; and a reading condition determining procedure that determines a reading condition of the image of the document based on the visible image data.

13. A computer data signal, embodied in a carrier wave, and representing a control program to control an image reading device having an illumination system that irradiates a document with visible light and infrared light, and an image detection system that detects an infrared component of an image of the document and a visible light component of the image of the document, the control program comprising:

an infrared component procedure that determines an infrared component level for pixels of the infrared component of the image;

a defective infrared component detecting procedure that detects a defective infrared component level of a defective pixel for which the determined infrared component level is less than a reference level;

a visible component procedure that determines a visible component level of the pixels of the visible light component of the image;

a correcting procedure that corrects the visible component level of the defective pixel based on the reference level and the defective infrared component level to obtain a corrected visible component level;

a visible image data obtaining procedure that outputs visible image data according to the visible component level of pixels other than the defective pixel and the corrected visible component level of the defective pixel; and a reading condition determining procedure that determines a reading condition of the image of the document based on the visible image data.

14. A method of controlling an image reading device that reads an image from a document, the method comprising the steps of:

forming an infrared component of the image of the document;

detecting an infrared component level of the infrared component for pixels of the image;

detecting a defective infrared component level of a defective pixel for which the detected infrared component level is less than a reference level;

forming a visible component of the image of the document;

detecting a visible component level for the pixels of the image;

correcting the visible component level of the defective pixel to obtain a corrected visible component level for the defective pixel based on the reference level and the detected defective infrared component level for the defective pixel;

outputting visible image data based on the detected visible component level of pixels other than the defective pixel and based on the corrected visible component level of the defective pixel; and determining a reading condition of the image of the document based on the visible image data.

15. The method of claim 14, further comprising:

detecting a minimum brightness level of the visible image data;

setting a gradation conversion characteristic with respect to the visible image data based on the detected minimum brightness level; and converting a gradation characteristic of the visible image data based on the set gradation conversion characteristic.

16. The method of claim 15, wherein the corrected visible component level is calculated by multiplying a detected visible component level of the defective pixel by a correction coefficient that is equal to the reference level divided by the defective infrared component level.

17. The method of claim 16, wherein the minimum brightness level is detected while excluding the detected visible component level of the defective pixel in which the detected infrared component level is less than a predetermined level that is lower than the reference level.

18. The method of claim 15, wherein the minimum brightness level is detected while excluding the detected visible component level of the defective pixel in which the detected infrared component level is less than a predetermined level that is lower than the reference level.

19. The method of claim 15, wherein:

the visible component forming step forms a plurality of visible wavelength components of the image;

the visible image data obtaining step outputs visible image data for each of the plurality of visible wavelength components;

the defective infrared component detecting step detects the defective pixel from the visible image data for each of the plurality of visible wavelength components;

the minimum brightness level detecting step detects the minimum brightness level of the visible image data for each of the plurality of visible wavelength components;

the gradation conversion characteristic setting step sets the gradation conversion characteristic for the visible image data for each of the plurality of visible wavelength components based on the minimum brightness level for each of the visible wavelength components; and the gradation characteristic converting step converts the gradation characteristic of the visible image data for each of the plurality of visible wavelength components based on the set gradation conversion characteristic for each of the visible wavelength components.

20. An image reading device comprising:

infrared component forming means for forming an infrared component of an image of a document;

infrared component detecting means for detecting an infrared component level of the infrared component for pixels of the image;

defective infrared component detecting means for detecting a defective infrared component level of a defective pixel for which the detected infrared component level is less than a reference level;

visible component forming means for forming a visible component of the image of the document;

visible component detecting means for detecting a visible component level for the pixels of the image;

correcting means for correcting the visible component level of the defective pixel to obtain a corrected visible component level for the defective pixel based on the reference level and the detected defective infrared component level for the defective pixel;

visible image data obtaining means for outputting visible image data based on the detected visible component level of pixels other than the defective pixel or based on the corrected visible component level of the defective pixel; and reading condition determining means for determining a reading condition of the image of the document based on the visible image data.

21. The image reading device of claim 20, further comprising:

minimum brightness level detecting means for detecting a minimum brightness level of the visible image data;

gradation conversion characteristic setting means for setting a gradation conversion characteristic with respect to the visible image data based on the detected minimum brightness level; and gradation characteristic conversion means for converting a gradation characteristic of the visible image data based on the set gradation conversion characteristic.

22. The image reading device of claim 21, wherein the correcting means calculates the corrected visible component level by multiplying a detected visible component level of the defective pixel by a correction coefficient that is equal to the reference level divided by the defective infrared component level.

23. The image reading device of claim 22, wherein the minimum brightness level detecting means detects the minimum brightness level while excluding the detected visible component level of the defective pixel in which the detected infrared component level is less than a predetermined level that is lower than the reference level.

24. The image reading device of claim 21, wherein the minimum brightness level detecting means detects the minimum brightness level while excluding the detected visible component level of the defective pixel in which the detected infrared component level is less than a predetermined level that is lower than the reference level.

25. The image reading device of claim 21, wherein:

the visible component forming means forms a plurality of visible wavelength components of the image;

the visible image data obtaining means outputs visible image data for each of the plurality of visible wavelength components;

the defective infrared component detecting means detects the defective pixel from the visible image data for each of the plurality of visible wavelength components;

the minimum brightness level detecting means detects the minimum brightness level of the visible image data for each of the plurality of visible wavelength components;

the gradation conversion characteristic setting means sets the gradation conversion characteristic for the visible image data for each of the plurality of visible wavelength components based on the minimum brightness level for each of the visible wavelength components; and the gradation characteristic converting means converts the gradation characteristic of the visible image data for each of the plurality of visible wavelength components based on the set gradation conversion characteristic for each of the visible wavelength components.

26. An image reading device comprising:

an illumination system that irradiates a document with visible light and infrared light;

an image detection system that detects an infrared component of an image of the document and a visible light component of the image of the document; and a controller that:

determines an infrared component level for pixels of the infrared component of the image;

detects a defective infrared component level of a defective pixel for which the determined infrared component level is less than a reference level;

determines a visible component level of the pixels of the visible light component of the image;

corrects the visible component level of the defective pixel to obtain a corrected visible component level for the defective pixel based on the reference level and the detected defective infrared component level for the defective pixel;

outputs visible image data based on the detected visible component level of pixels other than the defective pixel or based on the corrected visible component level of the defective pixel; and determines a reading condition of the image of the document based on the visible image data.

27. The image reading device of claim 26, wherein the controller:

determines a minimum brightness level of the visible image data;

sets a gradation conversion characteristic with respect to the visible image data based on the detected minimum brightness level; and converts a gradation characteristic of the visible image data based on the set gradation conversion characteristic.

28. The image reading device of claim 27, wherein the controller calculates the corrected visible component level by multiplying a detected visible component level of the defective pixel by a correction coefficient that is equal to the reference level divided by the defective infrared component level.

29. The image reading device of claim 28, wherein the controller determines the minimum brightness level while excluding the detected visible component level of the defective pixel in which the detected infrared component level is less than a predetermined level that is lower than the reference level.

30. The image reading device of claim 27, wherein the controller determines the minimum brightness level while excluding the detected visible component level of the defective pixel in which the detected infrared component level is less than a predetermined level that is lower than the reference level.

31. A computer readable storage medium that stores a control program to control an image reading device having an illumination system that irradiates a document with visible light and infrared light, and an image detection system that detects an infrared component of an image of the document and a visible light component of the image of the document, the control program comprising:

an infrared component procedure that determines an infrared component level for pixels of the infrared component of the image;

a defective infrared component detecting procedure that detects a defective infrared component level of a defective pixel for which the determined infrared component level is less than a reference level;

a visible component procedure that determines a visible component level of the pixels of the visible light component of the image;

a correcting procedure that corrects the visible component level of the defective pixel based on the reference level and the defective infrared component level to obtain a corrected visible component level;

a visible image data obtaining procedure that outputs visible image data according to the visible component level of pixels other than the defective pixel or according to the corrected visible component level of the defective pixel; and a reading condition determining procedure that determines a reading condition of the image of the document based on the visible image data.

32. A computer data signal, embodied in a carrier wave, and representing a control program to control an image reading device having an illumination system that irradiates a document with visible light and infrared light, and an image detection system that detects an infrared component of an image of the document and a visible light component of the image of the document, the control program comprising:

an infrared component procedure that determines an infrared component level for pixels of the infrared component of the image;

a defective infrared component detecting procedure that detects a defective infrared component level of a defective pixel for which the determined infrared component level is less than a reference level;

a visible component procedure that determines a visible component level of the pixels of the visible light component of the image;

a correcting procedure that corrects the visible component level of the defective pixel based on the reference level and the defective infrared component level to obtain a corrected visible component level;

a visible image data obtaining procedure that outputs visible image data according to the visible component level of pixels other than the defective pixel or according to the corrected visible component level of the defective pixel; and a reading condition determining procedure that determines a reading condition of the image of the document based on the visible image data.

33. A method of controlling an image reading device that reads an image from a document, the method comprising the steps of:

forming an infrared component of the image of the document;

detecting an infrared component level of the infrared component for pixels of the image;

detecting a defective infrared component level of a defective pixel for which the detected infrared component level is less than a reference level;

forming a visible component of the image of the document;

detecting a visible component level for the pixels of the image;

correcting the visible component level of the defective pixel to obtain a corrected visible component level for the defective pixel based on the reference level and the detected defective infrared component level for the defective pixel;

outputting visible image data based on the detected visible component level of pixels other than the defective pixel or based on the corrected visible component level of the defective pixel; and determining a reading condition of the image of the document based on the visible image data.

34. The method of claim 33, further comprising:

detecting a minimum brightness level of the visible image data;

setting a gradation conversion characteristic with respect to the visible image data based on the detected minimum brightness level; and converting a gradation characteristic of the visible image data based on the set gradation conversion characteristic.

35. The method of claim 34, wherein the corrected visible component level is calculated by multiplying a detected visible component level of the defective pixel by a correction coefficient that is equal to the reference level divided by the defective infrared component level.

36. The method of claim 35, wherein the minimum brightness level is detected while excluding the detected visible component level of the defective pixel in which the detected infrared component level is less than a predetermined level that is lower than the reference level.

37. The method of claim 34, wherein the minimum brightness level is detected while excluding the detected visible component level of the defective pixel in which the detected infrared component level is less than a predetermined level that is lower than the reference level.

38. The method of claim 34, wherein:

the visible component forming step forms a plurality of visible wavelength components of the image;

the visible image data obtaining step outputs visible image data for each of the plurality of visible wavelength components;

the defective infrared component detecting step detects the defective pixel from the visible image data for each of the plurality of visible wavelength components;

the minimum brightness level detecting step detects the minimum brightness level of the visible image data for each of the plurality of visible wavelength components;

the gradation conversion characteristic setting step sets the gradation conversion characteristic for the visible image data for each of the plurality of visible wavelength components based on the minimum brightness level for each of the visible wavelength components; and the gradation characteristic converting step converts the gradation characteristic of the visible image data for each of the plurality of visible wavelength components based on the set gradation conversion characteristic for each of the visible wavelength components.

* * * * *